United States Patent [19]
Kryger et al.

[11] 3,870,527
[45] Mar. 11, 1975

[54] GRANULAR STARCH-BASED GUMS

[75] Inventors: Allen C. Kryger; Charles S. Nevin; Donald L. Wilhelm, all of Decatur, Ill.

[73] Assignee: A. E. Staley Manufacturing Company, Decatur, Ill.

[22] Filed: June 26, 1972

[21] Appl. No.: 266,021

[52] U.S. Cl. ............... 106/2, 101/457, 260/233.3 R
[51] Int. Cl. ...................... C09k 3/00, C08b 19/06
[58] Field of Search ....... 106/2; 260/233.3; 101/457

[56] References Cited
UNITED STATES PATENTS

| | | | |
|---|---|---|---|
| 2,589,313 | 3/1952 | Wood | 101/457 |
| 2,813,093 | 11/1957 | Caldwell et al. | 260/233.3 |
| 3,725,386 | 4/1973 | Hanson et al. | 260/233.3 A |

FOREIGN PATENTS OR APPLICATIONS

| | | | |
|---|---|---|---|
| 715,565 | 8/1965 | Canada | 260/233.3 |

*Primary Examiner*—Joseph L. Schofer
*Assistant Examiner*—Herbert J. Lilling
*Attorney, Agent, or Firm*—Howard J. Barnett; Charles J. Meyerson

[57] ABSTRACT

Granular starch-based gums which are readily soluble in water and which exhibit excellent storage stability in aqueous solutions. These gums are useful as replacements for gum arabic, particularly in lithography. They may also be used as emulsifiers and stabilizers in foods, drugs and cosmetics when FDA approved. Additional uses in printing inks, paints, and wherever gum arabic is employed, are also contemplated. They comprise granular high-amylopectin starches containing 30 percent or less amylose which have been acid thinned, and which have a degree of substitution of a nonionic substituent from about 0.1 up to about 0.3. The possible nonionic substituents include alkyl, hydroxyalkyl, cyanoalkyl, amidoalkyl and acyl groups. In addition, carboxyl and amino groups can be used to increase the light sensitivity of the starches in sensitizer film solution applications. Lithographic films of high clarity are made possible by using the starch derivatives of the invention.

5 Claims, No Drawings

GRANULAR STARCH-BASED GUMS

BACKGROUND OF THE INVENTION

This invention is directed to new starch-based gum replacements for gum arabic, which are particularly useful in lithography. These starch-based gum products are also useful as film formers on coated pills, and as a gum base in cosmetics. They have relatively low viscosities at high concentrations, high solution stability and yield clear films. These gums are a close match for gum arabic in film forming and viscosity characteristics and in some applications, these starch-based gums perform better than gum arabic. Lithographic films and solutions made with the starch-based gums of the invention are substantially more stable than like films and solutions utilizing gum arabic.

Gum arabic has been widely used in lithography because of its relatively low viscosity and good rheological properties in concentrated solutions. It is obtained from acacia trees in subtropical and tropical zones, and is scarce. Prices for this scarce material can be expected to continue to increase, as both its cost of production and demand increase, so replacement of this material with a more readily available starch-based product is very desirable.

A consistently good quality gum arabic is difficult to obtain because of certain seasonal variations. The gum is marketed in a number of grades depending upon purity and color. For many applications, the gum arabic must be purified by dissolving it in water and by filtering the solution to remove coarse impurities.

In addition, gum arabic has a stability problem due to a hydrolytic enzyme residue which tends to lower the viscosity of the gum arabic during storage. For some applications, additional purifications by ion exchange treatment to remove minerals from the gum is required, thus adding even more to the cost of the usable material. This is not a problem with the starch-based gums of the subject invention, because there is no enzyme residue to contend with.

Conventional sensitizing solutions for deep-etch lithographic plates are made from combinations of gum arabic and bichromate, and the resulting films are insolubilized under the influence of light. Purified gum arabic is first dissolved in water and ammonium bichromate is added. The solution is then made alkaline with ammonium hydroxide. The sensitizer solution is then coated on a metal plate in a thin film which gives off ammonia as it dries, with a consequent lowering of pH. The bichromate solutions are kept alkaline for stability, but the film which is formed on the plate must have an acid pH for correct light sensitive image development. The shelf life of such plates utilizing gum arabic as a film former is so short that it has been considered impractical in the past to make up plates in advance of immediate demand. This causes considerable inconvenience an inefficient operations for the lithographer who must plan and schedule plate making just prior to image making (which is usually followed by a printing deadline).

DESCRIPTION OF THE PRIOR ART

To our knowledge, the starch-based gums of this invention provide the first completely satisfactory substitute for gum arabic in lithography. Earlier attempts have been made to use starches as gum arabic substitutes for lithographic applications. For example, pasted carboxymethyl starches have been proposed (U.S. Pat. No. 2,589,313). Such starches did not have the film forming properties required because of the presence of low molecular weight admixtures which are not easily removed. They are made under alkaline conditions, and sold as salts with high levels of salt impurities which will corrode lithographic plates after short periods of contact.

Various proposals have been made over the past fifty years to derivatize starch to obtain characteristics similar to those of water-soluble natural gums. Whistler, et al. INDUSTRIAL GUMS, Chapter XXXI, Academic Press, N.Y. (1959), page 727 ff. None of the products described in the above text have achieved appreciable commercial production, however. U.S. Pat. Nos. 2,516,634, 2,733,238, 2,802,000 and 2,845,417 describe some of these derivatized starches, but none of these references suggest the use of a starch-based gum in lithography to replace gum arabic.

As can be seen from U.S. Pat. Nos. 2,250,516, 2,520,161 and 2,589,313, various attempts have been made to synthesize gum arabic substitutes. Wood U.S. Pat. No. 2,250,516 proposes arabogalactan as a replacement for gum arabic in lithographic desensitizing solutions. Moe U.S. Pat. No. (2,520,161) discloses carboxyalkyl ethers of carbohydrate gums, such as galactomannan and glucomannan. Other carbohydrate gums which may be modified according to this reference include gum tragacanth, gum arabic and karaya gum. None of the gums disclosed are readily available, and all are more costly than the starch-based gums of this invention.

U.S. Pat. No. 2,589,313 to William H. Wood proposed the use of carboxymethyl ethers of cellulose, starch and water-soluble gums for lithographic plate treatment, but the method of purification is not disclosed. The method of making the carboxy ethers uses an alkaline solution of caustic soda or trimethyl ammonium hydroxide and the reagents listed include chloroacetic acid, chloromaleic acid, chloromalonic acid, and chloropropionic acid. Excess alkali is neutralized after the reaction with phosphoric or other mineral acid, and the ether is precipitated in alcohol or acetone as the alkali salt. The purification technique which applicants have found important is not disclosed, and it appears that the remaining salt residues and other reaction by-products can create considerable storage and corrosion problems when it is desired to store film coated lithographic plates for any substantial length of time.

British Pat. Specification No. 1,171,893 discloses non-granular hydroxypropyl derivatives of non-granular amylopectin obtained by starch fractionation. In the British specification the non-granular amylopectin fractions are dissolved by heating them in water at 110°C., or higher. The non-granular amylopectin fractions are enzymatically degraded in contrast to the granular, acid hydrolyzed starches of this invention. The saccharides produced in enzymatic depolymerization of pasted amylopectin are appreciably different from those in granular, acid hydrolyzed amylopectin starches. The removal of low molecular weight components from the pasted, non-granular, enzymatically depolymerized starch is difficult and expensive, making these non-granular starch derivatives impractical for use in lithography.

SUMMARY OF THE INVENTION

This invention is directed to starch-based gums which are excellent gum arabic replacements, and which are particularly useful in lithographic applications. These new starch-based gums have high degrees of solubility, relatively low viscosities at high concentrations, and high degrees of solution stability. They have excellent film forming characteristics, and can be readily prepared using acid thinning and selective substitution steps as described below. Carboxyl and amino substituents placed on the starch molecule have been found to provide increased light sensitivity when these gums are used in lithographic plate sensitizing solutions. Amidoalkyl substituents having hydrogen on the nitrogen atom have also been found to improve light sensitivity in sensitizing solution.

To obtain the starch-based gums of this invention, a granular starch is first slurried and adjusted by acid thinning to a viscosity in the range of 50–500 centipoise Brookfield (25 percent by weight starch solution at 80°F. with a No. 1 spindle at 20 r.p.m.). Care is taken to preserve the granular structure of the starch. The partially thinned, granular starch is then derivatized with monofunctional reagents such as propylene oxide, vinyl acetate or acrylamide to a degree of substitution of about 0.1 to about 0.3. During the derivatization step, the viscosity of the starch remains substantially constant. Low molecular weight material is then removed from the granular, derivatized, partially thinned starch material by water washing, and the starch derivatives can be cooked and filtered to remove insoluble materials, and then spray dried as a finished product.

If desired, the granular, derivatized, partially thinned starch-based gum product may be further treated prior to cooking by bleaching with oxidizing agents such as hypochlorite solution followed by washing. Hydrogen peroxide oxidation, followed by the removal of excess hydrogen peroxide with the aid of catalase provides an alternate bleaching process, more acceptable when food use is contemplated. Bleaching effects a general lightening of color in the starch gum product to give a more acceptable appearance. Although it is preferable to bleach the product while in the granular form, it is also contemplated that it can be bleached after cooking.

These starch derivatives of the invention are substantially free of low molecular weight admixtures and can be made up into hydrosols having solids relationship almost identical to gum arabic hydrosols. One starch-based gum made according to the invention may be used in the various phases of the lithographic art as a complete replacement for gum arabic, and viscosity may be closely controlled to satisfy the viscosity requirements of a particular lithographic application.

Granular waxy maize starch is normally used as the base starch, and is first acid hydrolyzed to the desired viscosity, and is then treated with propylene oxide. In contrast to previously known waxy maize starches, the starch-based gums of this invention form stable, non-glutinous solutions without the need for crosslinking, which has been used in the past to improve the stability of waxy maize starch solutions.

Other starches, including corn and potato starch can also be used instead of waxy maize starch, provided that the amylose content of the particular starch does not exceed about 30 percent. Waxy maize starch contains little or no amylose, and usually requires a lower degree of substitution than amylose containing starches to assure viscosity stability. The waxy maize starch-based gums also form films of superior clarity. The degree of starch thinning prior to the substitution step depends on the final viscosity desired, and is determined by the intended use for the starch-based gum product.

The acid-thinned starch is then derivatized by etherification or esterification to incorporate nonionic substituents, which may be starch ether or starch ester groups. Alkyl ether groups such as methyl or ethyl groups, and substituted alkyl ether groups such as hydroxyethyl, hydroxypropyl, cyanoethyl or amidoethyl groups can be used. Acyl groups such as acetyl can also be used, as well as other acyl groups.

Hydroxyethyl and hydroxypropyl groups are preferred hydrophilic substituents, because they have a high degree of solubility and solution stability when used in lithographic solutions. Hydroxypropyl substitution using propylene oxide is particularly preferred, because propylene oxide is inexpensive, safer to handle, and the reaction is more easily controlled under production conditions.

Amidoalkyl substituents having active hydrogen on the nitrogen atom are useful to enhance the light sensitivity of bichromate sensitized films used for lithographic imaging. Suitable amidoalkyl substituents can be introduced by treating the starch under alkaline conditions with acrylamide, N-methylacrylamide, or methacrylamide, all of which have molecular weights below 90.

Any nonionic substituent may be used that enhances starch solubility, provided that it does not impart characteristics to the starch which are incompatible with lithographic requirements. For example, starches having hydrophobic substituents may separate from solutions such as bichromate light-sensitizing solutions, and excessive hydrophobic substitution can result in dry films of irregular surface and consequent poor imaging capacity.

The starch-based gums of this invention should have a minimum degree of substitution of the nonionic substituent of about 0.1, and the maximum degree of substitution may be as high as about 0.3. Increasing substitution, particularly with hydrophilic substituents such as hydroxypropyl and amidoalkyl groups, appears to increase the swelling tendency of the starch and thereby interfere with the removal of low molecular weight components when washed with water. This purification is particularly important when the starch-based gums are to be used in making lithographic films, since the low molecular weight components adversely affect the film quality and storage stability.

To obtain the desired substitution, a slurried starch is reacted with propylene oxide under conditions which will preserve the granular structure of the starch. The reaction product is then separated and washed with water to remove low molecular weight by-products, such as starch cleavage products (oligosaccharides) produced in the acid thinning step, and electrolytes resulting from the use of alkaline catalysts employed in the substitution step. It is important to remove the low molecular weight by-products because they tend to impair the film forming characteristics of the starches of this invention, particularly in lithographic applications. The presence of appreciable amounts of salts is also objectionable because of their corrosive effect on lithographic plates and equipment. These by-products are effectively removed by the water wash described above.

The desired substitution may also be obtained in a dry granular reaction of starch with propylene oxide under essentially non-aqueous conditions. For example, it is possible to conduct the hydroxypropylation of the thinned starch by known methods of hydroxypropylating starch suspended in aliphatic ketones as set forth in U.S. Pat. No. 3,135,738 or by dry reacting of catalyst-impregnated starch with propylene oxide as set forth in U.S. Pat. No. 2,516,632. Washing the starch derivative with water is the most convenient and reliable means of removing the low molecular weight by-products. The hydroxypropyl substitution reaction of acid hydrolyzed, aqueous starch slurries followed by water wash presently appears to be the best all around method for making the starch-based gums of the invention.

The acid hydrolyzed, nonionically derivatized starch-based gums disclosed herein are excellent replacements for gum arabic in all major areas of lithographic applications. As has been pointed out above, amidoalkyl substituted starches having active hydrogen on the nitrogen atom will produce films having increased light sensitivity. Improved light sensitivity permitting accelerated image formation may also be obtained by introducing ionizing groups such as carboxyl groups and amino substituents into the starch molecule, and the choice is determined by whether an anionic or cationic product is desired. As much as 3 percent by weight carboxyl (anionic) can be added to the starch, although as little as 1 percent or less by weight carboxyl content causes substantially enhanced light sensitivity in the starch based films.

Limited amounts of carboxyl groups may be added to the starch molecule by oxidative reagents, such as by controlled hypochlorite oxidation of the starch taking care to avoid excessive thinning. Adding carboxyl groups in this manner should be carried out with allowances made for the starch thinning effect the oxidizing agent will have on the viscosity of the final product. For easier viscosity control, carboxylation by hypochlorite treatment can be carried out as part of the initial thinning operation before the substitution reaction is performed.

Light sensitizing amino groups may be introduced by a method such as is disclosed in U.S. Pat. No. 2,813,093 directed to a method of introducing dialkylaminoethyl ether groups. Aminoethyl ether groups can be introduced by treating the starch dry, or by slurrying the starch with ethylenimine. Adding an aminoethyl substituent to the starch is convenient and simple, and this substituent is particularly effective in enhancing the light sensitivity of the starch films formed from this product. Ethylenimine treatment of starch esters may cause cleavage of the ester groups, and should be avoided. Sodium hypochlorite treatment of aminoethyl starches should also be avoided because it destroys the amino groups.

As pointed out above, the light sensitivity of the starches of this invention may also be increased by means of amidoalkylation so as to produce starch ethers having hydrogen on the amido nitrogen atoms. These amido groups likewise may be attacked by hypochlorite reagent, and hypochlorite bleaching of amidoalkyl substituted starches should be avoided.

Prior to storage and shipping, the washed, granular starch-based gums are dried. The starch derivative can also be prepasted prior to shipping in order to convert the starch into a more readily soluble form. This can be done by preparing a starch paste, which may then be filtered, and by drying the starch paste by spray drying, or on hot rollers. The prepasted starch may also be obtained by drying slurried starch on hot rollers without requiring a separate pasting step.

The clarity of the starch solutions is dependent on their pH during pasting. In order to obtain starch solutions of the highest clarity, pasting should be carried out at pH 5 to 7.5, preferably at pH 6 to 7. Clarity is not improved by pasting at a pH below 5 and the starches are subject to oxidative instability at pH above about 7.5.

Hypochlorite treatment of the starch derivative can be employed to achieve improved filterability, and should be carried out incrementally. The hypochlorite bleach tends to react first with the protein fraction usually found in native starch, and only small additional amounts of hypochlorite are needed to achieve the improved filterability of the starch. During the hypochlorite treatment, a minor amount of starch oxidation may occur and minor amounts of carboxyl groups formed as a result, generally not exceeding about 0.1 to 0.2 weight percent carboxyl groups based on the weight of the starch, and not sufficient to create any problems with the film forming properties of the starch-based product.

In an alternate procedure, the starches of this invention may be bleached with the aid of small amounts of hydrogen peroxide, at a pH above 7, preferably at pH about 7.5 to about 8.5, either in slurried or pasted condition. It is generally convenient to use about 1 percent of a 35 percent hydrogen peroxide solution for each 100 g of starch. The bleaching is carried out at 100°F. for about 2 hours. Bleaching with hydrogen peroxide can be carried out on aqueous starch at any convenient temperature above the freezing point of water. Treatment time varies in an obvious manner with temperature and amounts of hydrogen peroxide used.

At the end of the bleach step, unreacted hydrogen peroxide is generally present, which should be destroyed to avoid possible oxidative degradation of the starch product during storage. It is convenient to destory excess hydrogen peroxide by treating the bleached starch mixture with catalase, such as "Fermcolase" fungal catalase. When 10 Baker units catalase per gram 35 percent hydrogen peroxide used is added to the starch mixture, the iodine color test for hydrogen peroxide is usually negative after stirring the mixture for 30–60 minutes at room temperature. Bleaching with hydrogen peroxide is preferred, because any residues are compatible with food, pharmaceutical, and cosmetic uses of the new starch-based gums of the invention.

The starch-based gums disclosed here form relatively clear aqueous solutions of 25 percent and higher concentrations, and have a high degree of solution viscosity stability. Solutions made according to the invention have been stored at room temperature for periods of 1–6 months, and even more than 12 months without undergoing viscosity change. Accordingly, batches of these starch-based gum solutions can be made up for lithographic use for considerable periods ahead of the intended use.

These starch-based gums have all the required characteristics to replace gum arabic in lithographic applications, and are superior to gum arabic in lithographic applications in a number of respects. Solutions of gum arabic and bichromate for deep-etch applications intended for storage must be made alkaline since they are unstable in lower pH ranges. However, the imaging of gum arabic-bichromate films can be carried out only at an acid pH. Consequently, ammonia must be driven off from gum arabic-bichromate films before they can be successfully irradiated. Similar solutions using our starch-based gums and bichromate are stable at a pH below 7, and the starch-bichromate can be successfully irradiated without any need to drive off ammonia as in the case of gum arabic based deep-etch solutions. Because of this, satisfactory and very stable acid starch-sodium bichromate solutions may be formulated, such as for deep-etch application, whereas equivalent gum arabic-based solutions tend to lose their stability and usefulness after only one day.

Gum arabic films tend to interact with certain bimetal lithographic plates, causing plate discoloration. Manufacturers of bimetal plates who presently use gum arabic-based gumming solutions can now avoid this problem by using the starch-based gums of this invention.

When lithographic plates coated with gum arabic-bichromate films are stored for any length of time, the films tend to harden, even in the dark ("dark-aging"). The problem is especially pronounced when storage is at high temperatures and humidities. These hardened films do not respond well after imaging to the developing process used in lithography. Serious dark aging may occur within one hour of coating a lithographic plate, and this problem seriously limits the conditions under which the coated plates can be stored, and the permissible storage periods.

Depending on humidity conditions, gum-arabic based plates which have been stored for only a half-day may dark age so extensively that it requires a significant amount of additional irradiation to image the films to provide sufficient contrast between irradiated and nonirradiated film areas. Gum arabic coated plates are normally not used in deep-etch applications after two days because sensitivity is lost. Such problems drastically limit the number of plates which can be usefully prepared and stored at one time. In contrast, the starch-based gum, bichromate coated plates of this invention retain image sensitivity, and are completely satisfactory for use, even after storage up to thirty days. Consequently a large number of coated lithographic plates can be prepared in advance of use requirements, with a great improvement in plate preparation efficiency.

Carboxyl or aminoalkyl groups are added to increase light sensitivity, these starch-based gums are less resistant to dark aging, but even these modified films are more stable than gum arabic-based films. The improvement in light sensitivity made possible by adding these groups must be balanced against the reduced storage times possible.

Press-ready lithographic plates are usually protected during storage with an outer gum arabic coating. If such a coating is used, it must be removed before the plates can be used in printing. To remove this protective coating, the plates are run "as if to print", and some 10 to 12 plate rotations are usually required to remove the protective coating. In contrast, coatings using the starch-based gums of this invention are much more easily removed after only a few "as if to print" rotations.

When gum arabic solutions are used in desensiter (fountain solutions), the required pumping tends to cause foaming, and this condition is undesirable for this application. The starch-based gums of this invention do not exhibit foaming action and are much more suitable for use in desensitizer (fountain) solutions.

In summary, these starch-based gums have properties equal to, and, in some cases, superior to native gum arabic, especially for all the uses in lithography. They are easily and inexpensively prepared from relatively inexhaustible supplies of abundant starches, whereas world supplies of gum arabic are shrinking rapidly. Because of their excellent film forming characteristics, these starch-based gums are also useful in food and other applications, such as for coating of candy, and in cosmetics.

DETAILED DESCRIPTION OF THE INVENTION

The following examples are directed to the presently preferred embodiments of the invention and are not intended to limit the claims which particularly point out and define the invention.

EXAMPLE 1

Starch hydrolysis was carried out as follows. A 21° Baume slurry of waxy maize starch (100 parts) was prepared in water at 60°F. The slurry temperature was then raised to 126°F., and 6 parts of 77.7 percent sulfuric acid diluted to about 30 Baume (density 1.26) was added to the slurry. The acidified slurry was held at 126°F. to an alkaline fluidity 66 (20 g. starch, 2N sodium hydroxide) which required about 18 hours. The slurry was adjusted to pH 4.5–5.0 by the addition of 6 percent (8.8 Baume) solution of 35 parts sodium hydroxide.

Hydroxypropylation, by reacting propylene oxide with the acid thinned starch, was accomplished with continuous agitation according to the following procedure. Anhydrous sodium sulfate (3.25 parts) was first added to the nearly neutralized slurry, and stirred to solution. One part of 6 percent sodium hydroxide solution was added gradually over a period of about 45 minutes. The gas space in the reaction chamber was then filled with nitrogen gas and propylene oxide (10 parts) was added to the slurry. The reaction was allowed to proceed for 8 hours at 108°–112°F. A second increment of propylene oxide (5 parts) was then added and allowed to react at the same temperature for an additional 15 hours. The starch derivative was filtered, washed and dried, and had an hydroxypropyl content of about 4.0 percent dry substance basis. Films made from this starch derivative using the proportions set forth below in Example 12 were effective in protecting developed plates for extended periods.

EXAMPLE 2

Bleaching of the starch derivative made according to Example 1 was carried out as follows. The slurry resulting from hydroxypropylation was treated with hypochlorite solution, using a bleach solution containing about 0.1 g chlorine per ml obtained by passing 3.0 parts chlorine into an aqueous solution of 4.0 parts sodium hydroxide, and the mixture was allowed to react for 1 hour at 108°–112°F., followed by 0.25 parts sodium metabisulfite which was allowed to react for 15 minutes at the same temperature. The slurry was filtered at pH 3, the starch reslurried at pH 6, which was established with the aid of ammonium hydroxide, filtered, washed and dried. When this was formulated with bichromate in a sensitizer solution, using the proportions as set forth in Example 10 below, the sensitized films prepared from the solution on a deep-etch plate remained useful for imaging for more than 1 month whereas similar gum arabic based films became unsuited for imaging within less than 1 week.

EXAMPLE 3

A starch prepared as in Example 1 was bleached and jet cooked as follows: To an 18° Baume slurry of the thinned, hydroxypropylated starch hydrogen peroxide, 1 part of hydrogen peroxide per 100 parts starch of 35 percent hydrogen peroxide, was added. The mixture was stirred at 110°F. for 2 hours and allowed to cool to room temperature, catalase (10 Baker units Fermcolase brand catalase per gram hydrogen peroxide used) was added to the stirred, cooled slurry, and stirring continued for 30 minutes. At the end of this period the iodine color test for excess hydrogen peroxide was negative. The slurry was filtered, the starch was washed with tap water, reslurried, and the slurry adjusted to pH 7 with dilute sulfuric acid. The neutral slurry was solubilized by jet cooking.

When the solubilized starch was used as described in Example 12 below to protectively coat a press-ready imaged plate it did not "blind" the image, and the protected plate printed true copies after a few rotations whereas similar gum arabic protected plates required the printing of several times as many copies before true copies were obtained.

EXAMPLE 4

Example 1 was repeated using potato starch instead of corn starch. The product obtained from potato starch was substantially equivalent to that obtained from corn starch, and performed equally well as a protective coating. This potato starch based derivative was also satisfactory when used in a light sensitizer solution following the procedure of Example 10, below.

EXAMPLE 5

Hydrolyzed waxy maize starch was amidoalkylated by means of acrylamide as follows. Waxy maize starch was acid hydrolyzed as described in Example 1. The hydrolysis mixture was neutralized with sodium hydroxide solution and filtered. The starch was washed with water and dried to a 9.5 percent moisture content. The dried starch (1500 parts, dry basis) was slurried in 2400 parts water containing 150 parts anhydrous sodium sulfate and 15.5 parts sodium hydroxide. Acrylamide (150 parts) was added to the slurry with stirring and the slurry was stirred at 115°F. for 16 hours. At the end of this reaction period, the mixture was adjusted to pH 6.0 with 30° Baume sulfuric acid and filtered. The filter cake of amidoalkylated starch was washed and filtered. After air-drying, the starch had about 9.5 percent moisture and 1.12 percent nitrogen content (dry basis) i.e., about 0.19 D.S.

The amidoalkylated starch was formulated as a light sensitive coating using the proportions and components as set forth in Example 10 below. The resulting film required only about one half as much exposure time for acceptable imaging as the starch of Example 1.

EXAMPLE 6

The acetylation of hydrolyzed starch by means of vinyl acetate was accomplished as follows. Waxy maize starch was first hydrolyzed as described in Example 1, and the final slurry was filtered, washed and dried. The dried starch contained about 9.5 percent moisture.

A starch slurry was prepared containing 2500 parts water and 1000 parts (dry basis) hydrolyzed waxy maize starch. Sodium carbonate (50 parts) was added to and dissolved in the stirred slurry. Vinyl acetate (150 parts) was added to the slurry which was then stirred for 5 minutes, adjusted to pH 4.0 with diluted sulfuric acid, and filtered. The filter cake was washed with water, reslurried in water, and filtered. After air drying the starch contained about 9.5 percent moisture, and 7.3 percent acetyl (about 0.26 D.S.). This acetylated starch derivative proved to be particularly useful as a protective coating for press-ready lithographic plates, and was also most effective when used in a sensitizer solution following the procedure and proportions set forth in Example 11 below.

EXAMPLE 7

A carboxymethylated propylene oxide treated starch was obtained by treating 1000 parts slurried starch product of Example 1 in 2200 parts water containing 20 parts dissolved sodium hydroxide, and 400 parts dissolved sodium sulfate with 80 parts ethyl acrylate. The slurry was maintained at 115°F. with stirring; the ethyl acrylate was added and the slurry maintained at pH 11.0 to 11.4 by the gradual addition of an aqueous solution containing 5 percent sodium hydroxide and 10 percent sodium sulfate. The reaction of the ethyl acrylate with the starch slurry was allowed to proceed for 2 hours, following which the reaction mixture was adjusted to pH 4.5 with diluted sulfuric acid, filtered, the filter cake was washed with tap water, reslurried, adjusted to pH 4.5 and dilute sulfuric acid solution, and the reslurried starch was then filtered, washed and dried. The starch product contained 0.58 percent carboxyl. Light sensitivity bichromate containing films based on this starch required only about half as much light exposure in imaging as similar films based on the starch of Example 1.

EXAMPLE 8

The hydrolyzed, propylene oxide treated starch of Example 1 was also treated with ethylenimine as follows. The dried starch product of Example 1 (100 parts) was placed in a pressure bottle, 1.85 parts ethylenimine dissolved in 20 parts water was added. Glass beads were then placed in the pressure bottle as an agitation aid, the bottles were capped and tumbled in a constant temperature bath at 180°F. for 2 hours. At the end of the reaction period, the bottle contents were removed and screened to separate the glass beads and minor amounts of lumped starch from the resulting amino substituted starch product which was then washed and dried.

The starch derivative analyzed at 0.3 percent nitrogen by weight, and is useful as a protective coating, and when this derivative was used in the proportions set forth in Example 10 below, it could be imaged using a much shorter light exposure time as compared to the starch derivative of Example 1 when subjected to the same procedure.

EXAMPLE 9

Example 2 was repeated up to and including the metabisulfite treatment. The resulting starch product was then screened, washed, and reslurried. The slurry was adjusted to about 6.0 pH with diluted sulfuric acid, cooked in a jet cooker at 300°F., the resultant paste was cooled to about 60°F., filtered, and spray dried. The dried starch product was readily cold-water soluble, and suitable for lithographic applications, such as in gumming, light sensitive films, and for fountain solutions.

EXAMPLE 10

A sensitizer solution was prepared containing 20 parts of a starch derivative prepared according to Example 9. Four (4) parts ammonium bichromate, 3 parts ammonium hydroxide (28 percent concentration) 0.1 parts Kiton blue dye, and 80 parts water. A plate was coated with this sensitizer solution on a whirler. After being stored in the dark for 30 days, the plate was exposed through a transparency. This plate required a development time of 6 minutes. For comparison, a plate coated with an identical sensitizer solution containing gum arabic instead of starch was stored in the dark under identical conditions for 7 days and then exposed through a transparency. This plate had "dark-aged" so extensively that it could not be developed.

EXAMPLE 11

A sensitizer solution containing 20 parts of a starch derivative prepared according to Example 2, 4 parts sodium bichromate and 80 parts water was adjusted to pH 5.0 by means of lactic acid. A lithographic plate was coated with the sensitizer solution and exposed through a transparency. The exposed plate required a development time of 5 minutes, the same as an analogous plate obtained by coating with a sensitizer solution containing 20 parts starch derivative, 4.0 parts ammonium bichromate, 3 parts ammonium hydroxide (28 percent concentration). The quality of the finished plates was indistinguishable from a plate made with the above described sensitizer solution base on ammonium bichromate.

EXAMPLE 12

A press-ready deep-etch plate was gummed with a gumming solution containing the starch-based gum of this invention on one side and with gum arabic on the other side. The gumming solutions are typically made up at 25 percent solids. After being stored for 30 days, the plate was mounted on a lithographic printing press, and the gum removed in the conventional manner by contacting with a water roll. After 5 printing impressions the side previously gummed with the starch derivative printed tube, the side previously gummed with gum arabic still had portions of the image blinded after 25 impressions.

EXAMPLE 13

Two similar ammonium bichromate based sensitizer solutions were prepared, one containing gum arabic and the other a starch derivative prepared according to Example 2, and then mixed in a sensitizer solution in the proportions set forth in Example 10 above. Each solution was coated on a plate, and the plates were stored in the dark at 100°F. and 90 percent relative humidity for about 1 hour. The plates were then exposed through transparencies in the usual manner. During this storage period the development time of the gum arabic coated, imaged plate increased from 4 to 12 minutes; the imaged, starch-based gum coated plate had an unchanged development time of 4 minutes.

EXAMPLE 14

A fountain solution based on a starch derivative of this invention was used in printing and circulated by a pump in a conventional manner.

It was observed that the solution foamed very little, to an insignificant degree. Similarly prepared gum arabic solutions under the same conditions may foam extensively and in a practically troublesome manner.

Since many embodiments of this invention may be made and since many changes may be made in the embodiments described, the foregoing is interpreted as illustrative and the invention is defined by the claims appended hereafter.

What is claimed is:

1. In an aqueous solution for coating lithographic plates, a hydrophilic film forming hydrocolloid comprising a starch derivative containing 30 percent or less by weight amylose, said starch comprising an acid hydrolyzed, initially granular starch derivative which has a Brookfield viscosity in the range of about 50 to about 500 centipoises when measured in a 25 percent by weight aqueous solution at 80°F. using a No. 1 spindle at 20 r.p.m.; said solution remaining viscosity stable for at least one month; said granular starch having a degree of substitution of about 0.1 to about 0.3 of at least one substituent having 1–4 carbon atoms and selected from the group consisting of alkyl, hydroxyalkyl, cyanoalkyl, amidoalkyl, and acyl groups, and said granular starch derivative having been washed with water to remove substantially all lower molecular weight, water soluble impurities, including starch cleavage products and inorganic salts.

2. In an aqueous solution for coating lithographic plates, a hydrophilic film forming hydrocolloid comprising a starch derivative containing 30 percent or less by weight amylose, said starch consisting of acid hydrolyzed, initially granular hydroxypropyl starch having a Brookfield viscosity of about 50 to about 500 centipoises in a 25 percent by weight aqueous solution at 80°F. employing a No. 1 spindle at 20 r.p.m., said granular starch having a hydroxypropyl group degree of substitution in the range of about 0.1 to about 0.3, and said initially granular starch derivative having been washed with water to remove substantially all lower molecular weight, water soluble impurities, including starch cleavage products and inorganic salts.

3. In an aqueous solution for coating lithographic plates, a hydrophilic film forming hydrocolloid including an acid hydrolyzed amidoalkyl, initially granular starch derivative containing 30 percent or less by weight amylose and having a Brookfield viscosity of about 50 to about 500 centipoises in a 25 percent by weight aqueous solution at 80°F. using a No. 1 spindle at 20 r.m.p., said starch derivative having a degree of substitution of amidoalkyl groups in the range of about 0.1 to about 0.3, and said starch derivative having been washed with water prior to solubilization to remove substantially all lower molecular weight, water soluble impurities, including starch cleavage products and inorganic salts.

4. In an aqueous solution for coating lithographic plates, a starch derivative as set forth in claim 1 which contains carboxyl groups up to about 3 percent by weight of the starch.

5. In an aqueous solution for coating lithographic plates, a starch derivative of claim 1 which additionally contains aminoalkyl groups up to about a degree of substitution of 0.1.

* * * * *